(12) United States Patent
Takashima et al.

(10) Patent No.: US 12,152,891 B2
(45) Date of Patent: Nov. 26, 2024

(54) REMOTE DRIVING SERVER, REMOTE DRIVING METHOD, AND STORAGE MEDIUM

(71) Applicant: TOYOTA JIDOSHA KABUSHIKI KAISHA, Toyota (JP)

(72) Inventors: Toru Takashima, Susono (JP); Takahiro Ogawa, Okazaki (JP); Kenji Tadakuma, Toyota (JP); Keisuke Miwa, Toyota (JP); Shuichi Tamagawa, Kitanagoya (JP); Takahiro Okano, Chiryu (JP); Shun Ota, Susono (JP); Yuki Nishikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 314 days.

(21) Appl. No.: 17/811,136

(22) Filed: Jul. 7, 2022

(65) Prior Publication Data

US 2023/0068930 A1    Mar. 2, 2023

(30) Foreign Application Priority Data

Aug. 30, 2021    (JP) ................. 2021-140340

(51) Int. Cl.
| | | |
|---|---|---|
| G01C 21/34 | (2006.01) | |
| G05D 1/00 | (2006.01) | |
| G06Q 30/0645 | (2023.01) | |
| G06Q 50/40 | (2024.01) | |
| H04W 4/021 | (2018.01) | |

(52) U.S. Cl.
CPC ..... *G01C 21/3461* (2013.01); *G01C 21/3469* (2013.01); *G05D 1/0022* (2013.01); *G06Q 30/0645* (2013.01); *G06Q 50/40* (2024.01); *H04W 4/021* (2013.01)

(58) Field of Classification Search
CPC ............ G01C 21/3461; G01C 21/3469; G06Q 30/0645; G06Q 50/30; G05D 1/0022; G05D 2201/0213; H04W 4/021
See application file for complete search history.

(56) References Cited

U.S. PATENT DOCUMENTS

| | | | |
|---|---|---|---|
| 2019/0286126 A1* | 9/2019 | Williams | ............... G08G 1/202 |
| 2019/0360829 A1* | 11/2019 | Ishibashi | ............ G01C 21/3469 |
| 2020/0272955 A1* | 8/2020 | Shimodaira | .......... G06Q 10/047 |
| 2020/0394923 A1* | 12/2020 | Thompson | ....... G08G 1/096816 |
| 2023/0105617 A1* | 4/2023 | Penilla | .................... B60L 58/21 |
| | | | 320/109 |

FOREIGN PATENT DOCUMENTS

JP        2013030194 A    2/2013

* cited by examiner

*Primary Examiner* — Anil K Bhargava
(74) *Attorney, Agent, or Firm* — Dickinson Wright, PLLC (57) ABSTRACT

A server receives a return request of a rental car including information on a usage end position of a car rental service desired by a user from a terminal of the user who has rented a rental car or the rental car. The server searches for a remote driving route of the rental car based on the information on the usage end position and information on a destination of the rental car for after the user finishes using the car rental service. The server compares the remote driving route with a communication area on a map. Then, the server transmits information indicating permission to drop off the rental car to the terminal of the user or the rental car when an entire route of the remote driving route is located inside the communication area.

5 Claims, 7 Drawing Sheets

REMOTE DRIVING SERVER, REMOTE DRIVING METHOD, AND STORAGE MEDIUM

CROSS-REFERENCE TO RELATED APPLICATION

This application claims priority to Japanese Patent Application No. 2021-140340 filed on Aug. 30, 2021, incorporated herein by reference in its entirety.

BACKGROUND

1. Technical Field

The present disclosure relates to a server, a method, and a storage medium for remotely driving a rental car.

2. Description of Related Art

Japanese Unexamined Patent Application Publication No. 2013-30194 (JP 2013-30194 A) discloses an information processing device that receives return of a rental car rented at one service base at another service base. This conventional device acquires information on a destination of a user who has rented a rental car and searches for a service base near the destination. This conventional device also searches for a route from the destination to a position of the service base and provides route guidance to the user. By providing this route guidance, the user can return (drop off) the rental car at the service base near the destination.

SUMMARY

A case in which a remote driving technique is applied to drop-off and return of a rental car is considered. In this case, remote driving is performed on a route from a destination of a user to a position of any service base around the destination. Thereby, the user can drop off and return the rental car at the destination instead of the service base near the destination. Therefore, when the remote driving technique is used, it is expected that the degree of freedom in the position where the rental can is dropped off and returned will be increased. However, in order to realize the drop-off and return of the rental car as described above, there are issues to be considered especially from the viewpoint of a communication environment and a cruising range.

One object of the present disclosure is to provide a useful technique capable of realizing drop-off and return of a rental car to which the remote driving technique is applied.

The first disclosure is a server that provides a car rental service using remote driving, and has the following characteristics.

The server includes an information processing device and a communication device. The information processing device includes a memory in which various kinds of information are stored and a processor that performs information processing using the various kinds of information. The communication device communicates with a terminal of a user who has rented a rental car or the rental car.

The various kinds of information include information on a communication area on a map, a usage end position of the car rental service desired by the user, and a destination of the rental car for after the user finishes using the car rental service.

When the processor receives a return request of the rental car including the information on the usage end position from the terminal of the user or the rental car, the processor performs a determination process for determining whether to permit drop-off of the rental car at the usage end position.

In the determination process, the processor
  searches for a remote driving route of the rental car for after the user finishes using the car rental service based on the information on the usage end position and the information on the destination,
  compares the remote driving route and the communication area based on the information on the remote driving route and the communication area, and
  transmits information indicating permission to drop off the rental car to the terminal of the user or the rental car via the communication device, when an entire route of the remote driving route is located inside the communication area.

The second disclosure further includes the following characteristics in the first disclosure.
  In the determination process, when a part of the remote driving route is located outside the communication area, the processor further transmits, to the terminal of the user or the rental car, information on an alternative position that is indicating a position on the remote driving route and that does not cross a route located outside the communication area.

The third disclosure further includes the following characteristics in the first or second disclosure.
  The various kinds of information further include information on a cruising range of the rental car.
  In the determination process, the processor further
  compares the cruising range with a route length of the remote driving route, and
  transmits the information indicating permission to drop off the rental car to the terminal of the user or the rental car via the communication device, when the entire route of the remote driving route is located inside the communication area and the route length is shorter than the cruising range.

The fourth disclosure further includes the following characteristics in the third disclosure.
  In the determination process, when a part of the remote driving route is located outside the communication area, the processor further transmits, to the terminal of the user or the rental car, information on an alternative position that is indicating a position on the remote driving route and that does not cross a route located outside the communication area.

The fifth disclosure further includes the following characteristics in the third or fourth disclosure.
  The various kinds of information further include information on a position of a refueling station or a position of a charging station.
  In the determination process, the processor further
  transmits, based on the position of the refueling station or the position of the charging station, information on a position of a refueling station or a position of a charging station located around the usage end position, to the terminal of the user or the rental car, when the route length is longer than the cruising range.

The sixth disclosure is a method of providing a car rental service using remote driving using a server, and has the following characteristics.

The method includes a step of receiving a return request of a rental car including information on a usage end position of the car rental service desired by a user from a terminal of the user who has rented the rental car or the rental car, a step of searching for a remote driving route of the rental car for after the user finishes using the car rental service based on the information on the usage end position and information on a destination of the rental car for after the user finishes using the car rental service, a step of comparing the remote driving route with a communication area on a map, and a step pf transmitting information indicating permission to drop off the rental car to the terminal of the user or the rental car when an entire route of the remote driving route is located inside the communication area.

The seventh disclosure is a storage medium storing a program that causes a server to execute providing a car rental service using remote driving, and has the following characteristics.

The program causes the server to execute a process of receiving a return request of a rental car including information on a usage end position of the car rental service desired by a user from a terminal of the user who has rented the rental car or the rental car, a process of searching for a remote driving route of the rental car for after the user finishes using the car rental service based on the information on the usage end position and information on a destination of the rental car for after the user finishes using the car rental service, a process of comparing the remote driving route with a communication area on a map, and a process pf transmitting information indicating permission to drop off the rental car to the terminal of the user or the rental car when an entire route of the remote driving route is located inside the communication area.

According to the first, sixth, or seventh disclosure, when the server receives the return request of the rental car, it is determined whether to permit drop-off of the rental car at the usage end position. In this determination, the route (remote driving route) when the rental car is remotely driven in response to the return request is calculated. Further, the remote driving route and the communication area are compared. Then, the server transmits the information indicating permission to drop off the rental car to the terminal of the user or the rental car when the entire route of the remote driving route is located inside the communication area. The fact that the entire route of the remote driving route is located inside the communication area means that the rental car can be collected by remote driving along the remote driving route. Therefore, by transmitting the information indicating permission to drop off the rental car in such a case, it is possible to drop off and return the rental car at the usage end position of the car rental service desired by the user.

According to the second or fourth disclosure, when a part of the remote driving route is located outside the communication area, the information on the alternative position that does not cross the route located outside the communication area is transmitted to the terminal of the user or the rental car. Therefore, even when the information indicating permission to drop off the rental car is not transmitted, an option to realize drop-off of the rental car is given to the user. Therefore, when the user accepts the action according to the option, it is possible to drop off and return the rental car at a position different from the originally planned usage end position.

According to the third disclosure, in addition to the comparison between the remote driving route and the communication area, the cruising range of the rental car and the route length of the remote driving route are compared. Then, when the entire route of the remote driving route is located inside the communication area and the route length is shorter than the cruising range, the information indicating permission to drop off the rental car is transmitted to the terminal of the user or the rental car. The fact that the route length is shorter than the cruising range means that the rental car can be collected without charging the travel battery or refueling during remote driving along the remote driving route. Therefore, by transmitting the information indicating permission to drop off the rental car in such a case, the same effect as that of the first disclosure can be obtained.

According to the fifth disclosure, when the route length is longer than the cruising range, the information on the position of the refueling station or the charging station located around the usage end position is transmitted to the terminal of the user or the rental car. Therefore, the same effect as that of the second or fourth disclosure can be obtained.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a remote driving server, a remote driving method, and a storage medium according to an embodiment of the present disclosure will be described with reference to the drawings. In each figure, the same or corresponding parts are designated by the same reference signs to simplify or omit the description.

1. Car Rental Service Using Remote Driving

Figure 1:
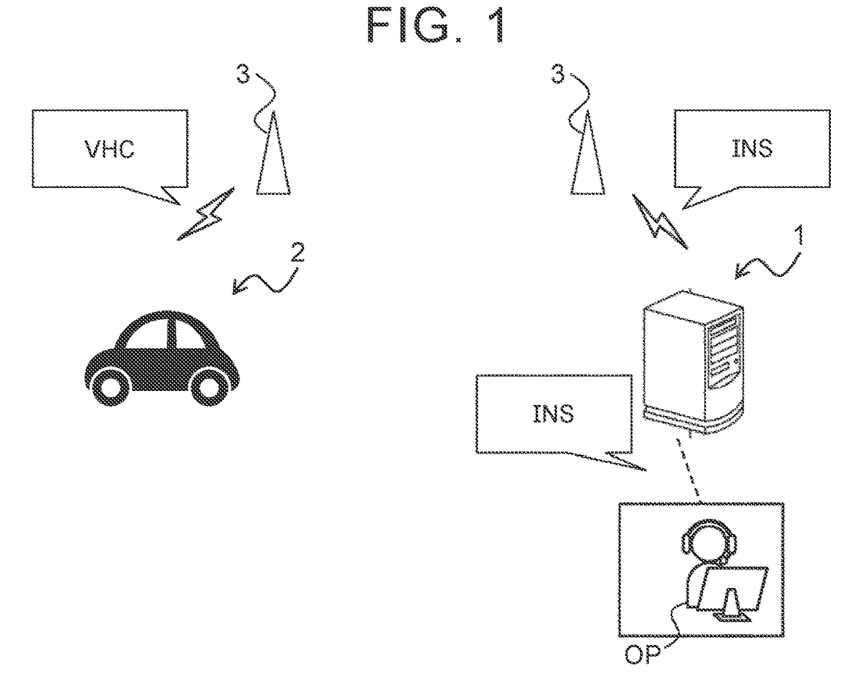
FIG. 1 is a diagram illustrating an outline of a car rental service using remote driving.

FIG. 1 is a diagram illustrating an outline of a car rental service using remote driving. In FIG. 1, a management server 1 and a rental car 2 are shown. The management server 1 corresponds to a remote driving server according to the embodiment. The management server 1 remotely drives the rental car 2. When the rental car 2 is remotely driven, the management server 1 communicates with the rental car 2 via a base station 3 of a network.

When remote driving is performed, vehicle information VHC is transmitted from the rental car 2 to the management server 1. The vehicle information VHC includes, for example, information on a current position of the rental car 2, information on a surrounding image of the rental car 2, and information on a travel state of the rental car 2 (for example, vehicle speed, acceleration, steering angle, etc.).

On the other hand, driving instruction information INS is transmitted from the management server 1 to the rental car 2. The driving instruction information INS is generated by a computer that remotely drives the rental car 2. This computer is equipped with a display, various input devices, and the like. The surrounding image of the rental car 2 is displayed on the display. The various input devices are operated by a remote operator OP. The driving instruction information INS is generated based on operation information of the input device by the remote operator OP and transmitted to the management server 1.

The car rental service using remote driving includes, for example, a vehicle dispatch service, a driving service, and a collection service. In the vehicle dispatch service, the rental car 2 is remotely driven from a service waiting position of the rental car 2 (for example, service base of a rental car operator) to a usage start position of the car rental service desired by a user (for example, home, workplace, destination, and the like of the user). In the driving service, the rental car 2 is remotely driven in response to a driving request from the user who is on board the rental car 2. In the collection service, the rental car 2 is remotely driven from a usage end position of the car rental service desired by the user (for example, home, workplace, and the like of the user) to a next service waiting position of the rental car 2 (for example, service base of the rental car operator).

2. Collection Service 2-1. Outline

In the embodiment, the collection service in the car rental service is considered. According to the collection service, the user can drop off the rental car 2 and return the rental car 2 to the rental car operator at the usage end position of the car rental service.

Figure 2:
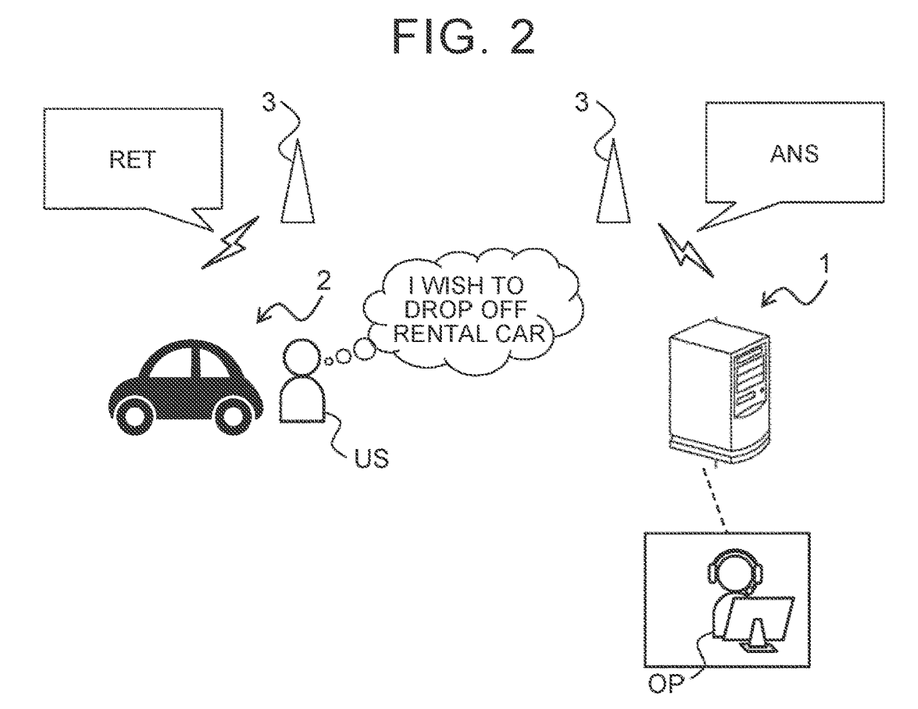
FIG. 2 is a diagram illustrating an outline of a collection service.

FIG. 2 is a diagram illustrating an outline of the collection service. The collection service is executed when the management server 1 receives information on a return request RET. The return request RET may be transmitted to the management server 1 from the rental car 2 or a terminal of a user US. The return request RET includes, for example, information on the usage end position desired by the user US and information on a usage end time. When the return request RET is received, the management server 1 performs "drop-off determination" for determining whether to permit drop-off of the rental car 2 at the usage end position. Then, the management server 1 transmits response information ANS to the rental car 2 or the terminal of the user US. The response information ANS includes information based on a result of the drop-off determination. The drop-off determination will be described below.

When the drop-off of the rental car 2 at the usage end position is permitted, the collection service is performed. When the collection service is performed, the management server 1 determines the remote operator OP who is in charge of the remote driving of the rental car 2. The remote operator OP performs remote driving from the usage end position to the destination of the rental car 2 (that is, next service waiting position described above). The destination is, for example, a service base located near the usage end position. Another example of the destination is a usage start position of the car rental service desired by another user (for example, home, workplace, destination, and the like of another user). Still another example of the destination is a service base located near the usage start position.

2-2. Drop-Off Determination

Figure 3:
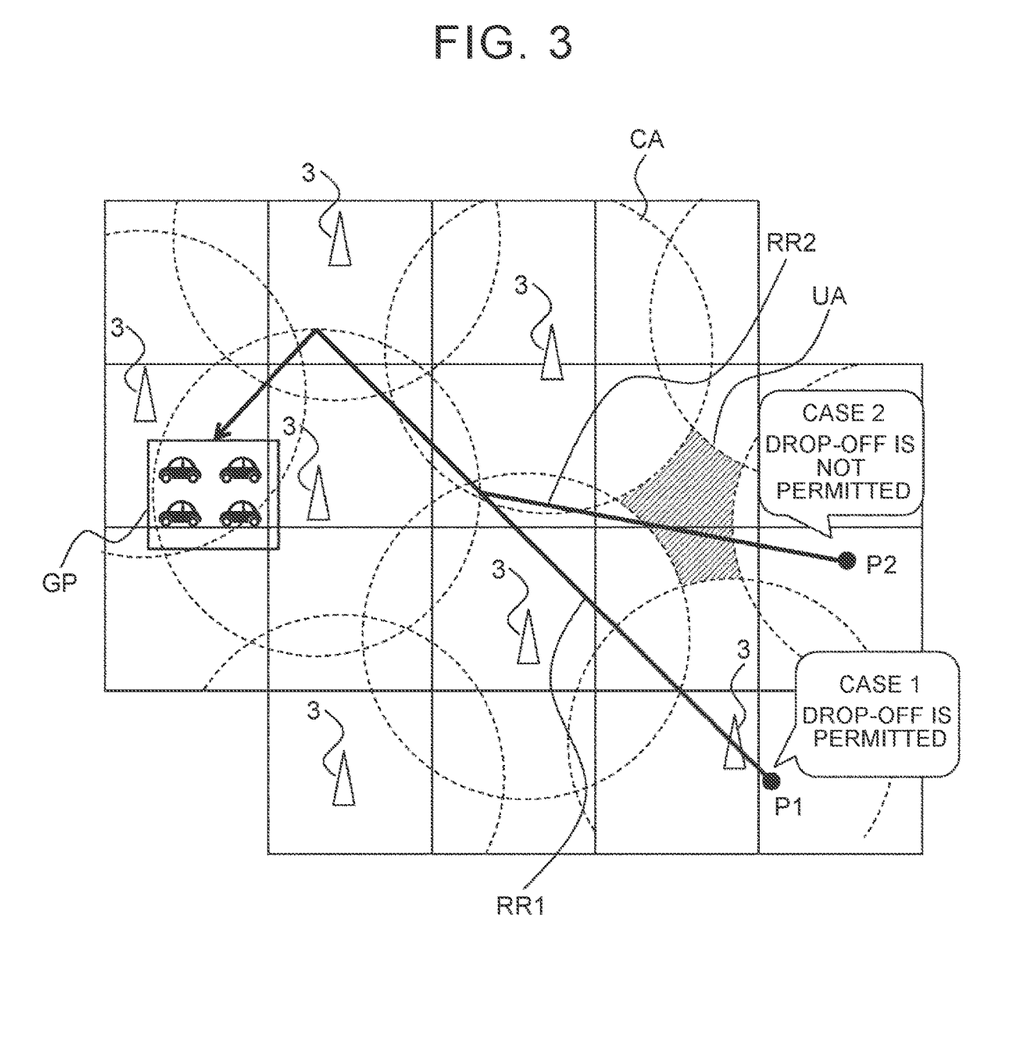
FIG. 3 is a diagram illustrating first and second examples of drop-off determination.

In the drop-off determination, for example, it is determined whether to permit the drop-off of the rental car 2 at the usage end position based on a comparison between a route where the rental car 2 is remotely driven in the collection service (hereinafter, also referred to as a "remote driving route") and a communication area. FIG. 3 is a diagram illustrating first and second examples of the drop-off determination. In FIG. 3, a map partitioned in a mesh shape is schematically illustrated. Multiple communication areas CA are illustrated on this map. Each of the communication areas CA is a circular area in which an installation position of the base station 3 is centered. When two adjacent communication areas CA overlap, information can be exchanged between these communication areas CA.

In FIG. 3, positions P1 and P2 are also illustrated. The position P1 corresponds to the usage end position in the first example. The position P2 corresponds to the usage end position in the second example. A destination GP in the first and second examples is a service base of a rental car operator, and is common between the first and second examples. In the first example, a remote driving route RR1 from the position P1 to the destination GP is generated, and in the second example, a remote driving route RR2 from the position P2 to the destination GP is generated. The remote driving routes RR1 and RR2 can be generated by a known route search technique.

In the first and second examples, the remote driving route and the communication area are compared. Here, in the first example, the entire route of the remote driving route RR1 is located inside the communication area CA. When the entire route is located inside the communication area CA, information can be exchanged between the management server 1 and the rental car. Therefore, in the first example, the response information ANS indicating "drop-off is permitted" is transmitted to the rental car 2 or the terminal of the user US.

On the other hand, in the second example, the remote driving route RR2 passes through an area UA that is not covered by the communication area CA (hereinafter, also referred to as a "non-communication area"). In the non-communication area UA, communication between the management server 1 and the rental car 2 will be interrupted. Therefore, in the second example, the response information ANS indicating "drop-off is not permitted" is transmitted to the rental car 2 or the terminal of the user US.

Figure 4:
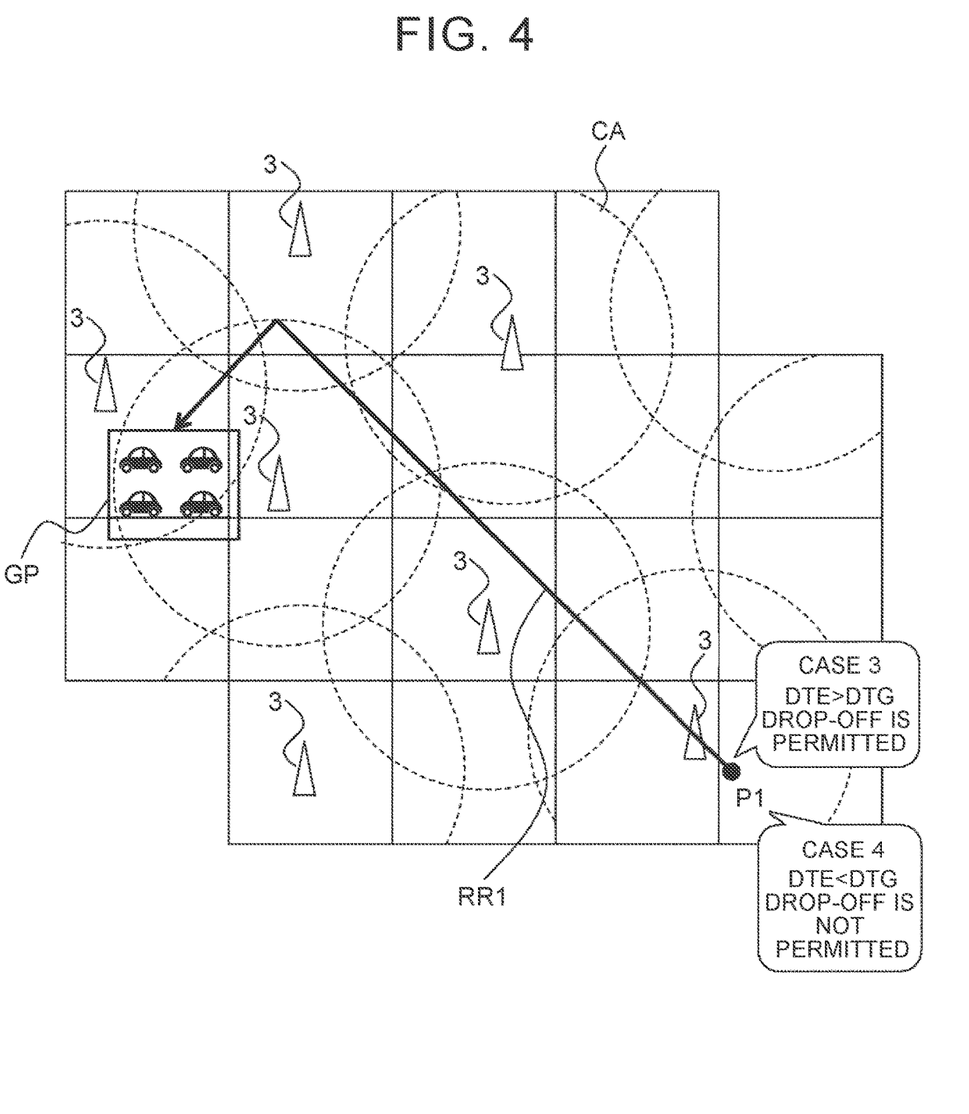
FIG. 4 is a diagram illustrating third and fourth examples of the drop-off determination.

In the drop-off determination, in addition to the comparison between the remote driving route and the communication area, a comparison based on the cruising range (distance to empty) may be performed. The cruising range is a distance for which the rental car 2 can navigate, and is calculated based on at least one of the remaining amount of a travel battery of the rental car 2 and the remaining amount of fuel of the rental car 2. The cruising range may be calculated by the rental car 2 or the management server 1. FIG. 4 is a diagram illustrating third and fourth examples of the drop-off determination. In FIG. 4, as in FIG. 3, multiple communication areas CA are illustrated. In FIG. 4, the remote driving route RR1 described in the first example of FIG. 3 is also illustrated.

In the third and fourth examples, as in the first and second examples, the remote driving route and the communication area are compared. In the third and fourth examples, a cruising range DTE and a route length DTG of the remote driving route RR1 are further compared. In the third example, the former is longer than the latter (DTE>DTG), and in the fourth example, the latter is longer than the former (DTE<DTG). When the latter is longer than the former, it will be necessary to charge the travel battery (or refuel) during remote driving. Therefore, in the fourth example, the response information ANS indicating "drop-off is not permitted" is transmitted. On the other hand, in the third example in which the former is longer than the latter, the response information ANS indicating "drop-off is permitted" is transmitted.

2-3. Proposal Example when Drop-Off is not Permitted

Figure 5:
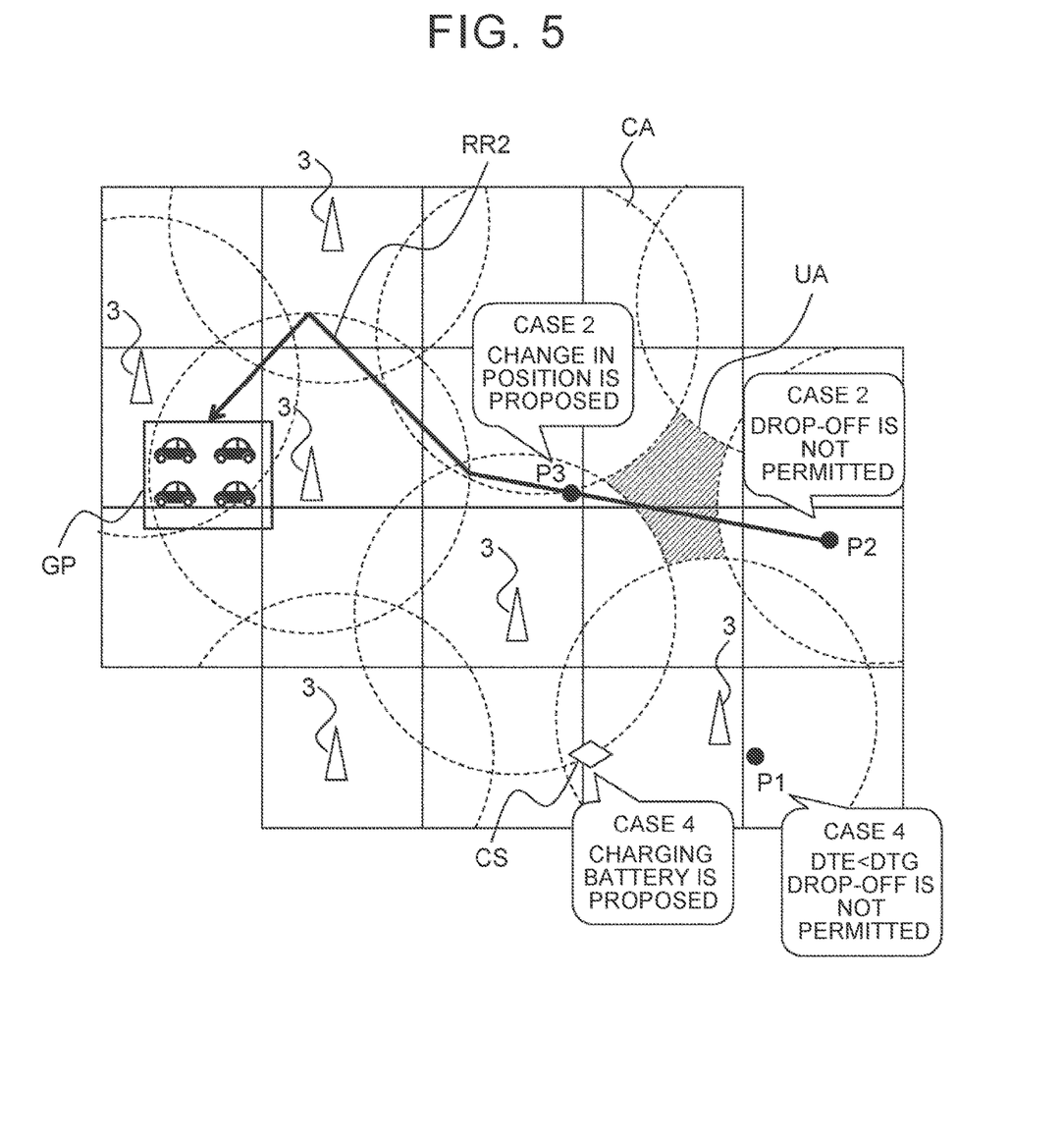
FIG. 5 is a diagram illustrating an example of alternative information.

When the response information ANS indicating "drop-off is not permitted" is transmitted, in addition to this information, alternative information may be proposed to the user US. FIG. 5 is a diagram illustrating an example of the alternative information. FIG. 5 illustrates the position P2 of the second example described in FIG. 3. As described above, in the second example, the remote driving route RR2 in the collection service passes through the non-communication area UA, and the drop-off of the rental car 2 at the position P2 is not permitted. Therefore, as the alternative information, information on a position P3 different from the position P2 is proposed. The position P3 is a position on the remote driving route RR2 and a position that does not cross the route on the non-communication area UA. Such alternative position information gives the user US an option to drop off the rental car 2 at the alternative position.

FIG. 5 also illustrates the position P1 of the fourth example described in FIG. 4. As described above, in the fourth example, the route length DTG is longer than the cruising range DTE, and the drop-off of the rental car 2 at the position P1 is not permitted. Therefore, as the alternative information, information on a position of a charging station CS (or refueling station) near the position P1 is proposed. Such alternative position information gives the user US an option to drop off the rental car 2 after the travel battery is charged (or more fuel is put) at the alternative position.

As described above, according to the embodiment, the drop-off determination is performed when the return request RET is received. Then, based on the result of the drop-off determination, the response information ANS indicating "drop-off is permitted" or "drop-off is not permitted" is transmitted to the terminal of the user US or the rental car 2. Therefore, when the response information ANS indicating "drop-off is permitted" is transmitted, the rental car 2 can be dropped off and returned at the usage end position desired by the user US.

Further, as long as the alternative information is additionally transmitted even when the response information ANS indicating "drop-off is not permitted" is transmitted, the option to realize the drop-off of the rental car 2 is given to the user US. Therefore, when the user US accepts the action according to the option, the rental car 2 can be dropped off and returned.

Figure 6:
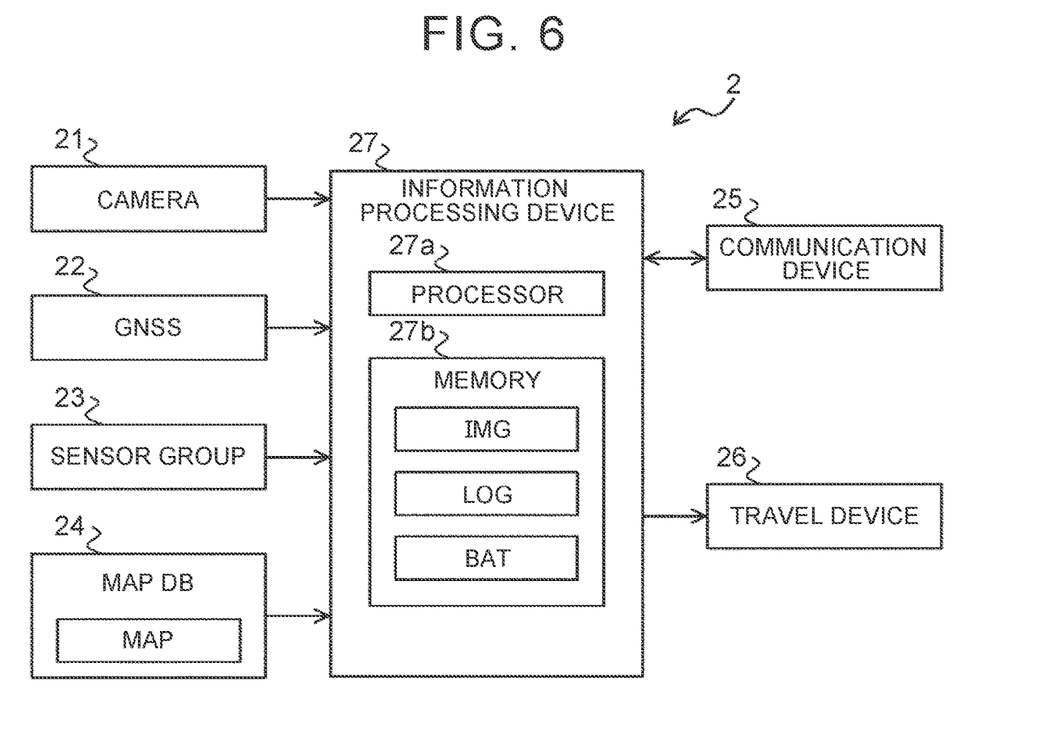
FIG. 6 is a block diagram showing a configuration example of the rental car shown in FIG. 1.

3. Configuration Example 3-1. Configuration Example of Side Receiving Collection Service Hereinafter, a configuration example for realizing the collection service using remote driving will be described. FIG. 6 is a block diagram showing a configuration example of the rental car 2 shown in FIG. 1. The configuration example shown in FIG. 6 include a camera 21, a global navigation satellite system (GNSS) receiving unit 22, a sensor group 23, a map database (DB) 24, a communication device 25, a travel device 26, and an information processing device 27. The component such as the camera 21 and the information processing device 27 are connected by, for example, an in-vehicle network (for example, controller area network (CAN)).

Multiple cameras 21 are provided inside and outside of the rental car 2. The camera 21 captures an image of a surrounding area of the rental car 2. Examples of the surrounding image include a front center image, a right front image, a left front image, a right side image, a left side image, and a rear image. The surrounding image is typically composed of a moving image. However, the surrounding image may be a still image. The camera 21 transmits information on the surrounding image IMG to the information processing device 27.

The GNSS receiving unit 22 is a device that receives signals from three or more artificial satellites. The GNSS receiving unit 22 acquires information on a current position LOC of the rental car 2. The GNSS receiving unit 22 may calculate a posture (direction) of the rental car 2 based on the acquired information on the current position LOC. The GNSS receiving unit 22 transmits the information on the current position LOC and the information on the posture of the rental car 2 to the information processing device 27.

The sensor group 23 includes a state sensor that detects the travel state of the rental car 2. Examples of the state sensor include a speed sensor, an acceleration sensor, a yaw rate sensor, and a steering angle sensor. The sensor group 23 also includes a recognition sensor other than the camera 21. The recognition sensor recognizes (detects) a target around the rental car 2 by using radio waves or light. Examples of the recognition sensor include a millimeter wave radar and laser imaging detection and ranging (LIDAR). The sensor group 23 further includes a sensor for detecting the remaining amount BAT of the travel battery (or the remaining amount of fuel). The sensor group 23 transmits information on the travel state of the rental car 2, information on the recognized target, information on the remaining amount BAT, and the like to the information processing device 27.

Map information MAP is stored in the map DB 24. Examples of the map information MAP include information on the position of a road, information on the shape of the road (for example, categories of curves and straight lines), and information on positions of an intersection and a structure. The map information MAP also includes information on positions of a charging station and a refueling station. The map DB 24 is provided in an in-vehicle storage device (for example, a non-volatile recording medium such as a hard disk or a flash memory). The map DB 24 may be provided in a computer (for example, external server such as the management server 1) capable of communicating with the rental car 2.

The communication device 25 performs wireless communication with the base station 3. Examples of a communication standard for this wireless communication include mobile communication standards such as fourth generation (4G), long term evolution (LTE), and fifth generation (5G). A connection destination of the communication device 25 includes at least the management server 1. In communication with the management server 1, the communication device 25 transmits, at least to the management server 1, information on the surrounding image IMG, the current position LOC, and the remaining amount BAT (or the cruising range DTE calculated based on the remaining amount BAT) received from the information processing device 27. When the return request RET is received from the information processing device 27, the communication device 25 transmits this to the management server 1.

The travel device 26 includes a device for accelerating, decelerating, and steering the rental car 2. The travel device 26 includes, for example, a driving device, a steering device, and a braking device. The driving device drives tires of the rental car 2. The steering device turns the tires of the rental car 2. The braking device applies braking force to the rental car 2. The rental car 2 is accelerated by the control of the driving device. The rental car 2 is decelerated by the control of the braking device. When the driving device is a motor, the rental car 2 may be braked by using regenerative brake controlled by the motor. The rental car 2 is steered by the control of the steering device.

The travel device 26 also includes a device for assisting travel of the rental car 2. Examples of the assisting device include a turn signal, a light (for example, a headlight, a fog lamp), a brake lamp, a wiper, and the like.

The information processing device 27 is a computer for processing various kinds of information acquired by the rental car 2. The information processing device 27 includes at least one processor 27a and at least one memory 27b. The processor 27a includes a central processing unit (CPU). The memory 27b is a volatile memory such as a double data rate (DDR) memory, and expands various programs used by the processor 27a and temporarily stores the various kinds of information. The various kinds of information acquired by the rental car 2 are stored in the memory 27b. The program is stored in a storage medium.

The processor 27a performs various kinds of control related to the travel of the rental car 2 by executing the program stored in the memory 27b. The processor 27a also determines whether remote driving is necessary by executing the program stored in the memory 27b. When the processor 27a determines that remote driving is necessary, the processor 27a generates the vehicle information VHC based on the various kinds of information stored in the memory 27b. The vehicle information VHC includes, for example, the information on the surrounding image IMG, the current position LOC, and the remaining amount BAT.

3-2. Configuration Example of Side Providing Collection Service

Figure 7:
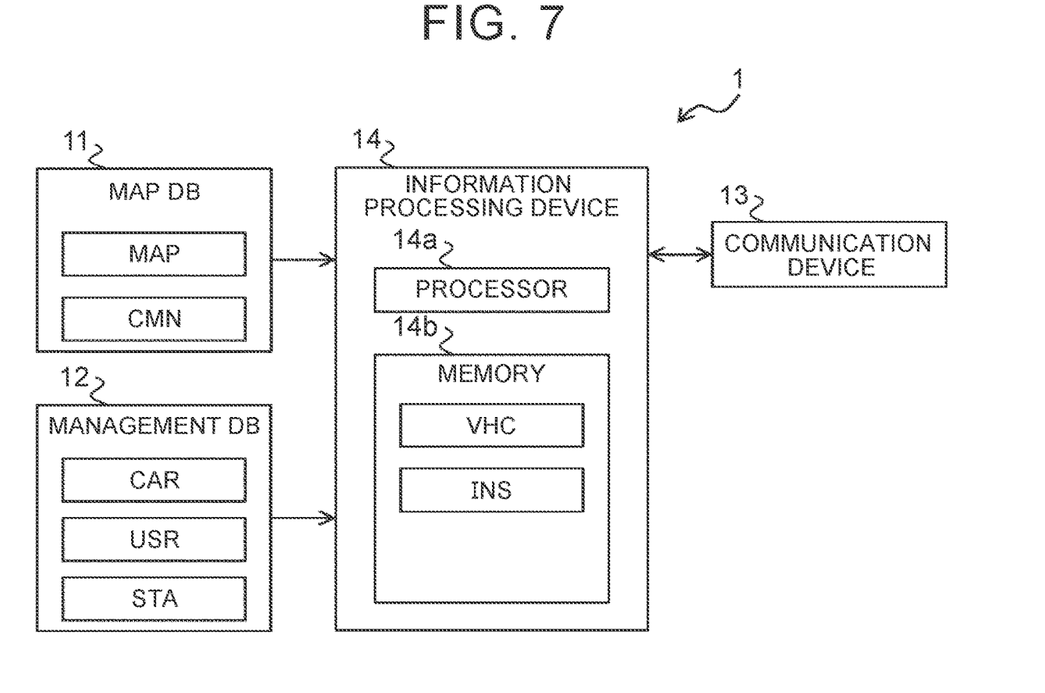
FIG. 7 is a block diagram showing a configuration example of a management server shown in FIG. 1.

FIG. 7 is a block diagram showing a configuration example of the management server 1 shown in FIG. 1. The configuration example shown in FIG. 7 includes a map DB 11, a management DB 12, a communication device 13, and an information processing device 14.

The map DB 11 stores the map information MAP and communication area information CMN. Examples of the map information MAP are as described in the description of the map DB 24. The communication area information CMN is information indicating the communication area on the map. The communication area information CMN may also be information indicating the non-communication area on the map. The map DB 11 is provided in a predetermined storage device (for example, a non-volatile recording medium such as a hard disk or a flash memory).

The management DB 12 stores identification information CAR and USR. The identification information CAR is information for identifying the rental car 2. The identification information CAR also includes the information on the current position of the rental car 2. The identification information USR is information for identifying the user US. When the user US uses the car rental service, a rental request from the user US (for example, information on the usage start position and information on the usage start time) is added to the identification information USR. When the management server 1 receives the return request RET, information on the return request RET (that is, information on the usage end position and information on the usage end time) is added to the identification information USR.

The management DB 12 also stores information on an implementation status STA of the car rental service by the rental car 2 (for example, service is being implemented, waiting for service, etc.). The implementation status STA may also indicate a detailed implementation status such as a rental can is being dispatched, being driven, or being collected. The various kinds of information stored in the management DB 12 are used for assigning the rental car 2 performed in response to the rental request and setting the destination of the rental car 2 performed in response to the return request RET. When the rental request is assigned or the destination is set, the information on the implementation status STA of the rental car 2 is added or updated.

The communication device 13 performs wireless communication with the base station 3. Examples of a communication standard for this wireless communication include mobile communication standards such as 4G, LTE, and 5G. A communication destination of the communication device 13 includes the rental car 2. In communication with the rental car 2, the communication device 13 transmits the driving instruction information INS to the rental car 2. When the return request RET is received from the rental car 2, the communication device 13 transmits the response information ANS to the rental car 2.

When the user US uses the car rental service, the communication destination of the communication device 13 includes the terminal of the user US. When the return request RET is received from the terminal of the user US, the communication device 13 transmits the response information ANS to the terminal of the user US. The response information ANS may be transmitted to both the terminal of the user US and the rental car 2.

The information processing device 14 is a computer for processing various kinds of information related to remote driving of the rental car 2. The information processing device 14 includes at least one processor 14a and at least one memory 14b. The basic configuration of the information processing device 14 is the same as that of the information processing device 27. Various programs and various kinds of information used by the processor 14a are stored in the memory 14b. The various programs include a remote driving program according to the embodiment. When the rental car 2 is remotely driven, the various kinds of information include the vehicle information VHC (for example, information on the surrounding image IMG, the current position LOC, and the remaining amount BAT) received from the rental car 2 and the driving instruction information INS received from the computer for causing the rental car 2 to be remotely driven.

4. Processing Example on Management Server

4-1. First Processing Example

Figure 8:
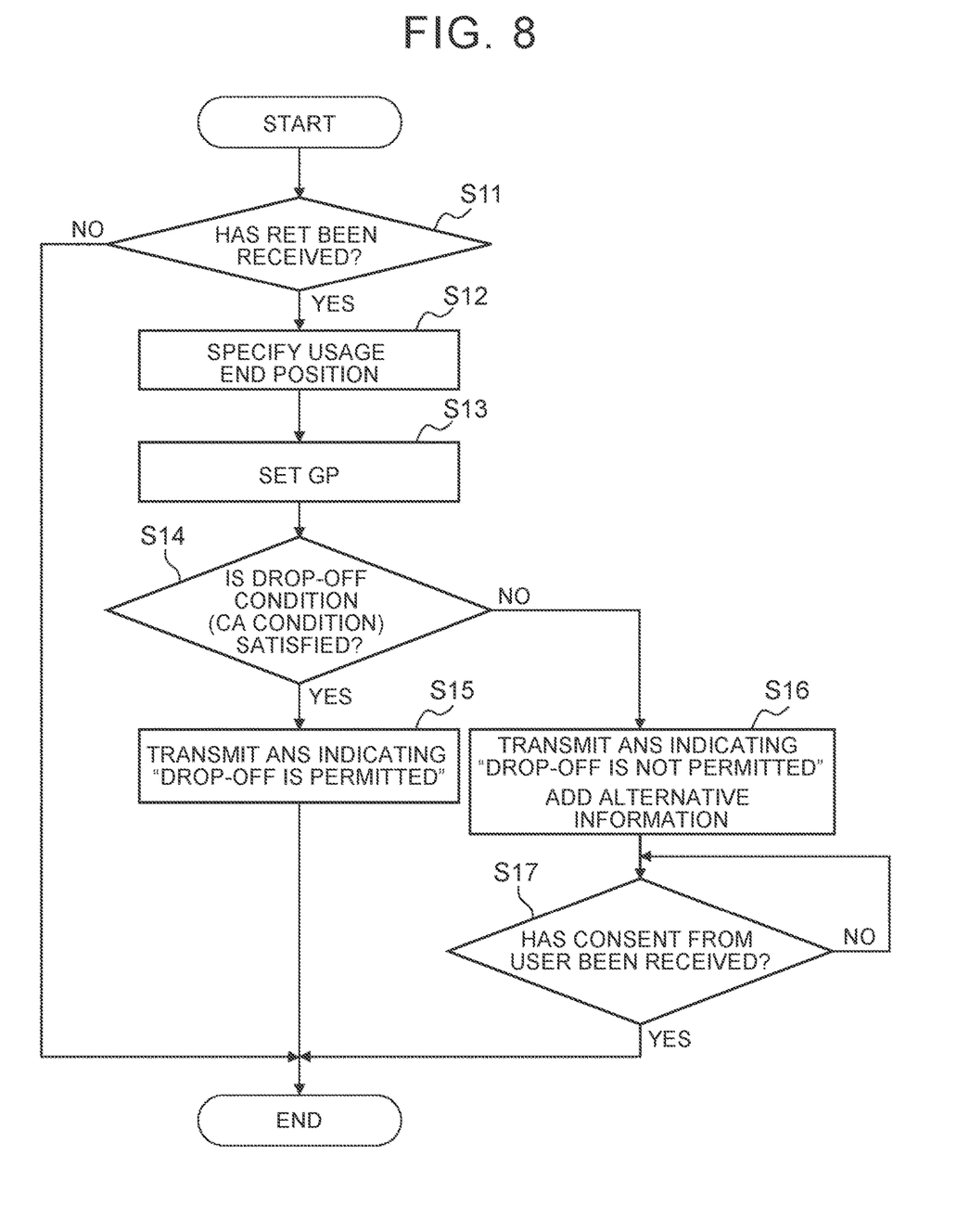
FIG. 8 is a flowchart showing a flow of a first processing example performed by the management server regarding the collection service.

FIG. 8 is a flowchart showing a flow of a first processing example performed by the management server 1 regarding the collection service. The routine shown in FIG. 8 is repeatedly executed at a predetermined cycle.

In the routine shown in FIG. 8, it is first determined whether the return request RET has been received (step S11). The return request RET is information transmitted to the management server 1 from the rental car 2 that the user US who wishes to return the rental car 2 is on board, or the terminal of the user US. As described above, the return request RET includes, for example, the information on the usage end position desired by the user US and the information on the usage end time. The usage end position is a current position of the rental car 2 or a position designated by the user US. The usage end time is a current time or a time designated by the user US. When the determination result in step S11 is No, the routine processing ends.

When the determination result in step S11 is Yes, the usage end position is specified (step S12). The information on the usage end position is included in the return request RET received in step S11. When the user US specifies the usage end position, this position is specified as the usage end position. On the other hand, when the user US does not specify the usage end position, the current position of the rental car 2 is specified as the usage end position.

Following the process of step S11, the destination GP is set (step S13). The destination GP is set in consideration of, for example, a waiting position of the rental car 2 waiting for service, which is different from the rental car 2 to be returned, and a rental request by another user.

Specifically, when the rental request is received, each distance from the usage start position included in the rental request to each of these rental cars 2 is calculated. When the distance from the rental car 2 to be returned to the usage start position is the shortest, and the usage start time included in the rental request is equal to or less than a predetermined time counting from the current time, this usage start position is set as the destination GP. When the distance from the rental car 2 waiting for service to the usage start position is the shortest, or when the usage start time is equal to or longer than the predetermined time counting from the current time, a service base located closest to the usage end position specified by the process of step S12 is set as the destination GP.

Following the process of step S13, it is determined whether the drop-off condition is satisfied (step S14). In the process of step S14, first, the remote driving route is set. As the remote driving route, a route connecting the usage end position specified by the process of step S12 and the destination GP set by the process of step S13 is searched. It is desirable that multiple candidates be searched as the remote driving route. Subsequently, the remote driving route and the communication area CA are compared. As the information on the communication area CA, information read from the map DB 11 is used. When there are multiple candidates, a comparison between each candidate and the communication area CA is performed individually. When the entire route in one remote driving route is located inside the communication area CA, it is determined that the drop-off condition is satisfied.

When the determination result in step S14 is Yes, the response information ANS indicating "drop-off is permitted" is transmitted (step S15). The response information ANS indicating "drop off is permitted" includes, for example, notification information indicating "turn off the ignition switch of the vehicle and get off the vehicle." This notification information is displayed or reproduced, for example, on a human machine interface (HMI) device of the rental car 2 or the terminal of the user US.

When the determination result in step S14 is No, the response information ANS indicating "drop-off is not permitted" is transmitted (step S16). The response information ANS indicating "drop-off is not permitted" includes, for example, notification information indicating "You cannot get off the vehicle here, so consider to change the position of the vehicle." Further, the alternative information is added to the response information ANS. The alternative information is information on a position on the remote driving route searched in the process of step S14 and that does not cross the route on the non-communication area UA. As an alternative position, for example, multiple positions are proposed at the same time. When multiple candidates for the remote driving route are searched in the process of step S14, alternative positions in all the candidates are proposed.

Following the process of step S16, it is determined whether the consent from the user US has been received (step S17). For example, when the withdrawal of the return request RET is received, it is determined that the consent from the user US has been received. When the user US does not specify the usage end position, it can be determined as follows. That is, when the current position LOC of the rental car 2 changes after the response information ANS indicating "drop-off is not permitted" is transmitted, it is determined that the consent from the user US has been received.

4-2. Second Processing Example

Figure 9:
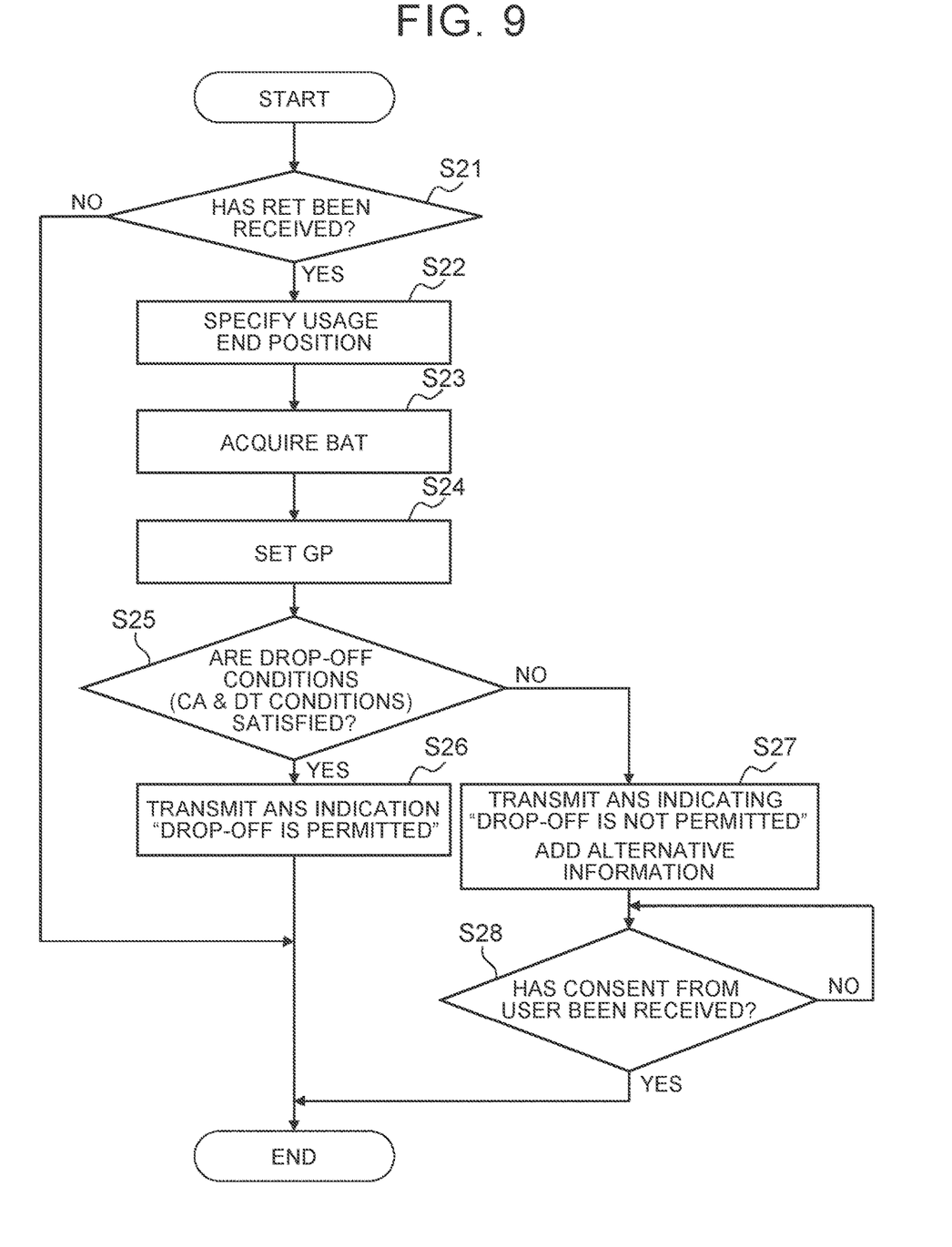
FIG. 9 is a flowchart showing a flow of a second processing example performed by the management server regarding the collection service.

FIG. 9 is a flowchart showing a flow of a second processing example performed by the management server 1 regarding the collection service. The routine shown in FIG. 9 is repeatedly executed at a predetermined cycle as in the routine shown in FIG. 8.

In the routine shown in FIG. 9, it is first determined whether the return request RET has been received (step S21). Further, when the determination result in step S21 is Yes, the usage end position is specified (step S22). The processes of steps S21 and S22 are the same as the processes of steps S11 and S12 shown in FIG. 8, respectively.

Following the process of step S22, the information on the remaining amount BAT of the travel battery is acquired (step S23). The information on the remaining amount BAT is included in the vehicle information VHC transmitted from the rental car 2 to the management server 1. When the cruising range DTE based on the remaining amount BAT has already been calculated in the rental car 2, the information on the cruising range DTE may be acquired instead of the information on the remaining amount BAT.

Following the process of step S23, the destination GP is set (step S24). The content of the process of step S24 is the same as the content of the process of step S13 shown in FIG. 8.

Following the process of step S24, it is determined whether the drop-off condition is satisfied (step S25). In the process of step S25, first, the remote driving route is set. An example of setting the driving route is as described in the process of step S14 in FIG. 8. In the process of step S25, the cruising range DTE is also calculated based on the information on the remaining amount BAT acquired in step S23. Then, in the process of step S25, it is determined whether the following conditions (i) and (ii) are satisfied.

(i) The entire route in the remote driving route is located inside the communication area CA.

(ii) The cruising range DTE is longer than the route length DTG of the remote driving route. When the conditions (i) and (ii) are satisfied at the same time, it is determined that the drop-off condition is satisfied.

When the determination result in step S25 is Yes, the response information ANS indicating "drop-off is permitted" is transmitted (step S26). The content of the process of step S26 is the same as the content of the process of step S15 shown in FIG. 8.

When the determination result in step S25 is No, the response information ANS indicating "drop-off is not permitted" is transmitted (step S27). An example of the response information ANS indicating "drop-off is not permitted" is as described in step S26 of FIG. 8. Further, the alternative information is added to the response information ANS. The alternative information is set according to the determination result in step S25. Specifically, when the condition (i) is not satisfied, an alternative position is set as the alternative information. A method of proposing the alternative position is also as described in step S26 of FIG. 8. When the condition (ii) is not satisfied, the position of the charging station CS near the usage end position is searched. Then, the information on the position of the charging station CS is set as the alternative information.

Following the process of step S27, it is determined whether the consent from the user US has been received (step S28). The content of the process of step S28 is the same as the content of the process of step S17 shown in FIG. 8.

5. Effect

According to the embodiment described above, when the management server 1 receives the return request RET, the drop-off determination is performed. Then, based on the result of the drop-off determination, the response information ANS indicating "drop-off is permitted" or "drop-off is not permitted" is transmitted to the terminal of the user US or the rental car 2. Therefore, when the response information ANS indicating "drop-off is permitted" is transmitted, it is possible to drop off and return the rental car 2 at the usage end position desired by the user US.

Further, according to the embodiment, even when the response information ANS indicating "drop-off is not permitted" is transmitted, the alternative information is additionally transmitted. Therefore, the option to realize the drop-off of the rental car 2 is given to the user US. As a result, when the user US accepts the action according to the option, it is possible to drop off and return the rental car 2 at a usage end position different from the usage end position desired by the user US. The present disclosure may be applied to an autonomous driving vehicle.

What is claimed is:

1. A remote driving server that provides a car rental service using remote driving, the remote driving server comprising:
an information processing device including a memory in which various kinds of information are stored and a processor that performs information processing using the various kinds of information; and
a communication device that communicates with a terminal of a user who has rented a rental car or with the rented rental car, wherein:
the various kinds of information include information on a communication area on a map, a usage end position of the car rental service desired by the user, and a destination of the rental car for after the user finishes using the car rental service;
when the processor receives a return request of the rental car including the information on the usage end position from the terminal of the user or the rental car, the processor performs a determination process for determining whether to permit drop-off of the rental car at the usage end position; and
in the determination process, the processor
searches for a remote driving route of the rental car for after the user finishes using the car rental service based on the information on the usage end position and the information on the destination,
compares the remote driving route and the communication area based on the information on the remote driving route and the communication area, and
transmits information indicating permission to drop off the rental car to the terminal of the user or the rental car via the communication device, when an entire route of the remote driving route is located inside the communication area;
wherein:
the various kinds of information further include information on a cruising range of the rental car; and
in the determination process, the processor further:
compares the cruising range with a route length of the remote driving route,
transmits the information indicating permission to drop off the rental car to the terminal of the user or the rental car via the communication device, when the entire route of the remote driving route is located inside the communication area and the route length is shorter than the cruising range; and
when a part of the remote driving route is located outside the communication area, the processor further transmits, to the terminal of the user or the rental car, information on an alternative position that is indicating a position on the remote driving route and that does not cross a route located outside the communication area.

2. The remote driving server according to claim 1, wherein in the determination process, when a part of the remote driving route is located outside the communication area, the processor further transmits, to the terminal of the user or the rental car, information on an alternative position that is indicating a position on the remote driving route and that does not cross a route located outside the communication area.

3. The remote driving server according to claim 1, wherein:
the various kinds of information further include information on a position of a refueling station or a position of a charging station; and
in the determination process, the processor further transmits, based on the position of the refueling station or the position of the charging station, information on a position of a refueling station or a position of a charging station located around the usage end position, to the terminal of the user or the rental car, when the route length is longer than the cruising range.

4. A remote driving method of providing a car rental service using remote driving using a server, the remote driving method comprising:
a step of receiving a return request of a rental car including information on a usage end position of the car rental service desired by a user from a terminal of the user who has rented the rental car or from the rented rental car;

a step of searching for a remote driving route of the rental car for after the user finishes using the car rental service based on the information on the usage end position and information on a destination of the rental car for after the user finishes using the car rental service;

a step of comparing the remote driving route with a communication area on a map; and a step of transmitting information indicating permission to drop off the rental car to the terminal of the user or the rental car when an entire route of the remote driving route is located inside the communication area;

wherein:

the step of searching for a remote driving route is further based on a cruising range of the rental car; and the method further comprises:
- a step of comparing the cruising range with a route length of the remote driving route,
- a step of transmitting the information indicating permission to drop off the rental car to the terminal of the user or the rental car via the communication device, when the entire route of the remote driving route is located inside the communication area and the route length is shorter than the cruising range; and
- when a part of the remote driving route is located outside the communication area, the step of transmitting, to the terminal of the user or the rental car, information on an alternative position that is indicating a position on the remote driving route and that does not cross a route located outside the communication area.

5. A non-transitory storage medium storing a remote driving program that causes a server to execute providing a car rental service using remote driving, and causes the server to execute:

- a process of receiving a return request of a rental car including information on a usage end position of the car rental service desired by a user from a terminal of the user who has rented the rental car or from the rented rental car;
- a process of searching for a remote driving route of the rental car for after the user finishes using the car rental service based on the information on the usage end position and information on a destination of the rental car for after the user finishes using the car rental service;
- a process of comparing the remote driving route with a communication area on a map; and
- a process of transmitting information indicating permission to drop off the rental car to the terminal of the user or the rental car when an entire route of the remote driving route is located inside the communication area;

wherein:

the process of searching for a remote driving route is further based on a cruising range of the rental car; and the program further causes the server to execute:
- a process of comparing the cruising range with a route length of the remote driving route,
- a process of transmitting the information indicating permission to drop off the rental car to the terminal of the user or the rental car via the communication device, when the entire route of the remote driving route is located inside the communication area and the route length is shorter than the cruising range; and
- when a part of the remote driving route is located outside the communication area, the process of transmitting, to the terminal of the user or the rental car, information on an alternative position that is indicating a position on the remote driving route and that does not cross a route located outside the communication area.

\* \* \* \* \*